(12) United States Patent
Krauthamer

(10) Patent No.: US 11,311,805 B2
(45) Date of Patent: Apr. 26, 2022

(54) HANDHELD OBJECT CHARACTERISTIC ASSESSMENT SYSTEM AND METHOD

(71) Applicant: Universal City Studios LLC, Universal City, CA (US)

(72) Inventor: Akiva Meir Krauthamer, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 130 days.

(21) Appl. No.: 16/806,632

(22) Filed: Mar. 2, 2020

(65) Prior Publication Data

US 2021/0268378 A1 Sep. 2, 2021

(51) Int. Cl.
| | | |
|---|---|---|
| A63F 13/00 | (2014.01) | |
| A63F 13/428 | (2014.01) | |
| A63F 13/213 | (2014.01) | |
| G06F 3/01 | (2006.01) | |

(52) U.S. Cl.
CPC .......... *A63F 13/428* (2014.09); *A63F 13/213* (2014.09); *G06F 3/011* (2013.01); *G06F 3/017* (2013.01); *A63F 2300/1087* (2013.01)

(58) Field of Classification Search
CPC .......... A63F 13/04; A63F 13/213; G06T 7/73; G06T 2207/30204; G06F 3/011; G06F 3/0346; A61B 34/20; A61B 2034/2057; A61B 2034/2065; A61B 2090/3983
See application file for complete search history.

(56) References Cited

U.S. PATENT DOCUMENTS

| | | | |
|---|---|---|---|
| 6,729,544 B2 | 5/2004 | Navon | |
| 8,425,313 B2 | 4/2013 | Nelson et al. | |
| 2003/0032478 A1* | 2/2003 | Takahama | A63F 13/5255 463/30 |
| 2010/0013860 A1* | 1/2010 | Mandella | A63F 13/428 345/650 |
| 2014/0110470 A1 | 4/2014 | Segal | |
| 2014/0111639 A1* | 4/2014 | Tanaka | G06T 7/74 348/135 |
| 2018/0046835 A1* | 2/2018 | Hong | G06K 7/1443 |
| 2019/0228541 A1 | 7/2019 | Tanaka | |

OTHER PUBLICATIONS

PCT/US2021/020332 International Search Report and Written Opinion dated Jun. 4, 2021.

* cited by examiner

*Primary Examiner* — Lawrence S Galka
(74) *Attorney, Agent, or Firm* — Fletcher Yoder, P.C.

(57) ABSTRACT

A handheld object includes a reference element having an angle-identifying element that is captured differently in images depending on a viewpoint of a camera. The angle-identifying element generates a first characteristic in a first captured image from a first viewpoint of the camera, and a second characteristic in a second captured image from a second viewpoint of the camera. Based on the characteristic generated by the angle-identifying element in a captured image, the orientation of the handheld object is determined. A pointing target of the handheld object is also determined based on the orientation of the handheld object and determining the position of the reference element. The reference element also includes a device identifier. The camera captures a first portion of the device identifier a first image, and a second portion of the device identifier in a second image. The portions are combined together to form the complete device identifier.

20 Claims, 6 Drawing Sheets

HANDHELD OBJECT CHARACTERISTIC ASSESSMENT SYSTEM AND METHOD

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

In entertainment venues, for example, a handheld object may be used in coordination with other system components to activate interactive experiences. For example, gyroscopes in a handheld object may be used by a system to determine that the handheld object is pointed toward a particular target and the target may be selected by the system in response to this determination. In the setting of a theme park, a patron may point at an animated figure of an attraction using a handheld object, and, in response to detecting this, a system may cause the animated figure to output a user interaction experience (e.g., wagging a tail of the animated figure). It is now recognized that there is a need for improved (e.g., more cost effective) systems and methods for detecting characteristics of handheld objects to facilitate provision of appropriate responses to orientation and positioning of the handheld objects and/or data associated with the respective handheld objects.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an entertainment system includes a camera that captures an image of a handheld object including an angle-identifying element of the handheld object. The entertainment system also includes a controller having a processor and a memory. The memory stores machine-readable instructions that cause the processor to identify the angle-identifying element of the handheld object in the image, and determine an orientation of the handheld object based on a detected characteristic of the angle-identifying element in the image.

In an embodiment, a handheld object facilitates detection of an orientation of the handheld object by a monitoring system. The handheld object includes a body that is to be handheld, and an angle-identifying element having multiple sections. Each section is visually distinguishable in relation to other sections. The handheld object also includes a lens positioned adjacent the angle-identifying element such that one or more sections of the multiple sections are visible, via the lens, to a camera at a particular position relative to the angle-identifying element.

In an embodiment, one or more non-transitory, computer-readable media stores instructions which, when executed by at least one processor, cause the at least one processor to perform operations including receiving an image of a handheld object and identifying a reference element of the handheld object in the image. The instructions also cause the at least one processor to perform operations including determining a position of the handheld object based on the image, and detecting an angle-identifying feature of the reference element in the image. The instructions further cause the at least one processor to perform operations including determining an orientation of the handheld object based on a characteristic of the angle-identifying feature, and determining a pointing target of the handheld object based on the position and orientation of the handheld object.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
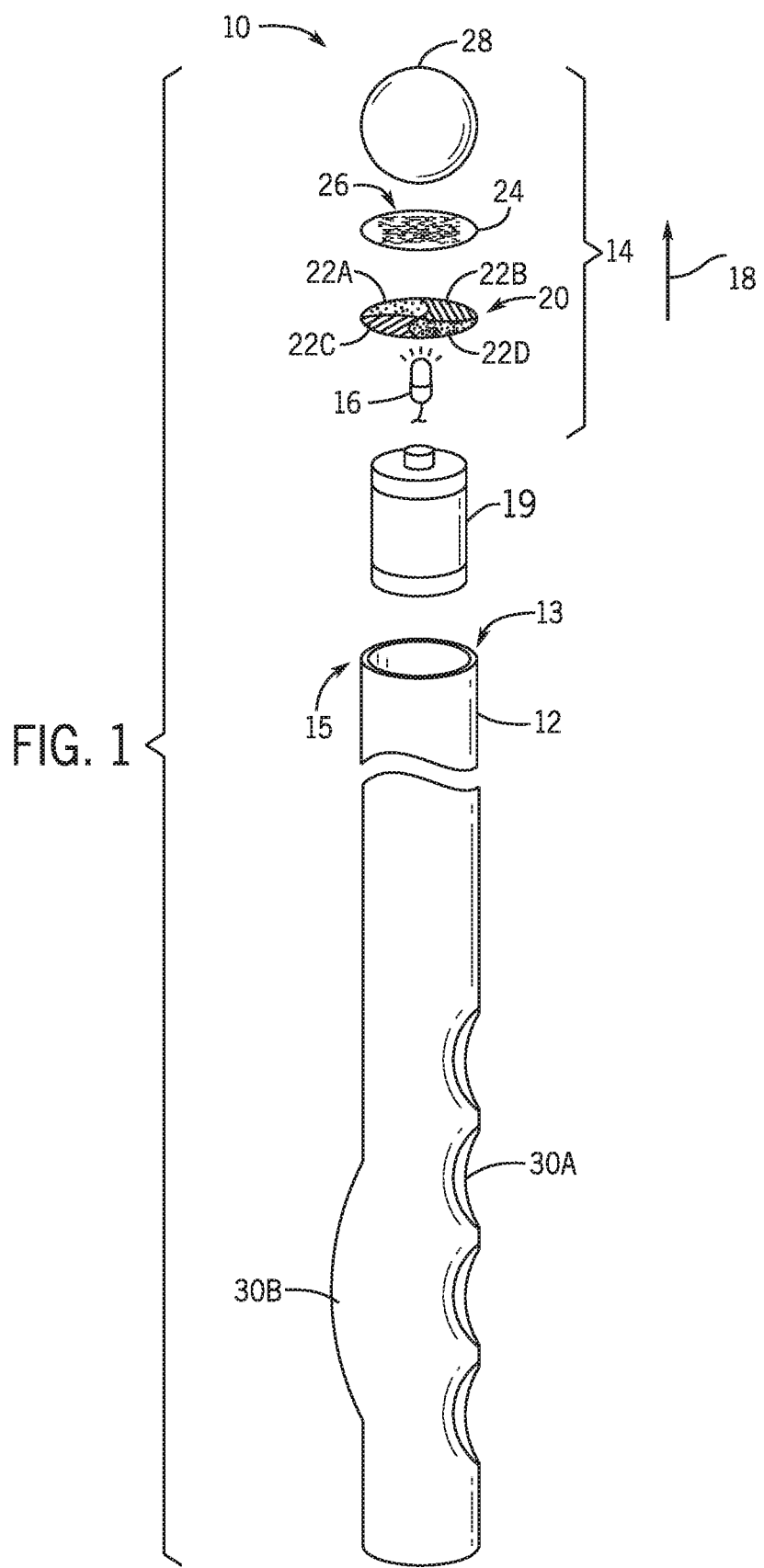
FIG. 1 is a schematic diagram of a handheld object, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to a system including a handheld object used for pointing to initiate interactions and, more particularly, to using the system to determine an angle or identifier of the handheld object to facilitate designation of appropriate interactions based on such characteristics of the handheld object. Determining an angle at which the handheld object is held may facilitate determining a target at which the handheld object is pointed. This may ensure that the attraction outputs the proper user interaction experience. For example, a particular target among a plurality of targets may be accurately designated as selected based on a pointing direction of the handheld object and an associated effect may appropriately be generated. Moreover, the attraction may output different user interaction experiences based on the patron. Thus, determining an identifier of the handheld object may ensure that the attraction outputs the proper user interaction experience associated with the patron.

In particular, a handheld object in accordance with the present disclosure may include a reference element that allows for detection of characteristics of the handheld object, including a relative angle and/or data associated with the handheld object. In an embodiment, the reference element includes an angle-identifying element that is designed to be captured differently in images depending on a relative viewpoint of a camera. For example, the angle-identifying element may generate a certain detected characteristic, such as first color or pattern (e.g., blue, checkered colors, barcode), in a first captured image from a first viewpoint of the camera (e.g., when taken from a right side of the reference element), but generate a different detected characteristic, such as a second color or pattern (e.g., red, stripes, QR code), in a second captured image from a second viewpoint of the camera (e.g., when taken from a left side of the reference element). Accordingly, based on the color or pattern generated by the angle-identifying element in a captured image, the orientation of the handheld object may be estimated. In combination with determining the position of the reference element, a pointing target of the handheld object may then be determined. Other aspects of the reference element may allow for detection of data associated with the handheld object (e.g., user identity information), which can also be used for generation of desired effects. For example, images of the reference element captured from multiple angles may combine to provide the system with identifying information (e.g., a QR code).

The passive nature of the reference element avoids expense associated with including active elements (e.g., gyroscopes, communication devices) in the handheld object to send position information to a control system. Indeed, the reference element may simply operate to be viewable based on self-lighting or external lighting. Thus, active monitoring of motion data within the handheld object and communication of the motion data from the handheld object may be avoided, which beneficially avoids complexity and associated expenses for each handheld object. In accordance with the present disclosure, passive operation includes operation of the reference element with or without self-lighting and excludes any internal measurement function (e.g., operation of a gyroscope) of the reference element within the handheld object.

In accordance with an embodiment of the present disclosure, a system may include cameras, processors, and memory that coordinate and are programmed to provide responses to certain detected characteristics associated with use of the handheld object. As an example, a user may point the handheld object at an animated object (e.g., a robot or otherwise animated figure) of an attraction, and, in response to determining that the pointing target is the animated object, the animated object may output a user interaction experience (e.g., wagging a tail). As another example, the user may point at a word on a poster, and, in response to determining that the pointing target is the poster, a nearby speaker may output a voice speaking the word in the poster. As yet another example, the user may point to an image of a person on an electronic display, and, in response to determining that the pointing target is the image of the person, the display may play a video showing the person in the image moving.

In some embodiments, the determined orientation of the handheld object may facilitate determining whether the user is waving the handheld object in a specific pattern (e.g., a figure eight pattern). For example, the orientations of the handheld object may be determined in multiple images captured by the camera. That is, based on the type of image captured in various locations, the orientations of the handheld object at each position may be deduced by the system using a table or algorithm stored in memory that correlates orientations with the detected images. The orientations may be compared to the specific pattern. If the orientations approximately match the specific pattern, then the output device may output the user interactive experience.

As previously noted, a system in accordance with the present disclosure may also detect characteristics of the handheld object, such as data associations (e.g., a user identity for the handheld object). Thus, the reference element may include a device identifier. For example, the device identifier may be in the form of a barcode or Quick Response (QR) code. While only a portion of the device identifier may be captured in an image, the camera (or cameras) may capture multiple images of different portions of the device identifier, and combine or stitch the portions together to form the complete device identifier. In response to identifying the device identifier, the output device may output a user interactive experience that is associated with the device identifier.

By way of introduction, FIG. 1 is a schematic diagram of a handheld object 10, according to embodiments of the present disclosure. The handheld object 10 may include a body 12, which may be any suitable shape. As illustrated, the body 12 may be shaped as a shaft or wand, though in other embodiments, the body 12 may include any shape that a user may point with (e.g., a projective device (such as a gun), a wearable item (such as a glove), a wrist-mounted device (such as a watch).

The body 12 may include a recess 13, in which a reference element 14 is disposed. As illustrated, the reference element 14 may be disposed at an end 15 of the handheld object 10, and may provide an indication of where the handheld object 10 is positioned (e.g., when using image recognition techniques). In particular, the reference element 14 may include a light source 16. A system or computing device attempting to locate the handheld object 10 may use image recognition techniques to detect the light produced from the light source 16 and emitted from the reference element 14.

The light source 16 may be any suitable light-producing device that emits light in a direction 18. For example, the light source 16 may be positioned at a distal end of the handheld object 10 and may even be collimated to facilitate specifically directing light emitted from the light source 16 and detection of where the handheld object 10 is pointed based on detection of the light. As illustrated, the light source 16 may be a light bulb, such as a liquid crystal display (LCD), light-emitting diode (LED) or an organic LED (OLED). The light source 16 may be battery-powered and/or rechargeable (e.g., by plugging the body 12 into a recharging station or connecting a charging cord to the body). A power source 19 (e.g., battery, capacitor, power harvesting circuitry) may be included for this purpose. In some embodiments, the light source 16 may be a wireless-powered light (e.g., using ultra high frequency (UHF) power harvesting). While the illustrated light source 16 emits light in the visible spectrum, in some embodiments, the light source 16 may emit light in a non-visible spectrum (e.g., infrared or ultraviolet spectrums). In additional or alternative embodiments, the light source 16 may include a light-reflecting device, such as retroreflective material (e.g., retroreflective sheeting, retroreflective fabric, retroreflective glass beads, microprisms, encapsulated lenses sealed onto a fabric or plastic substrate, and/or metal tape). As such, light entering the body 12 may be reflected by the light-reflecting device, causing the reflected light to be emitted in the direction 18.

The handheld object 10 may include an angle-identifying element 20 that enables light from the light source 16 to pass therethrough. The angle-identifying element 20 may include a filter or a screen (e.g., pass-through filters), such as in the form of a printed image. The angle-identifying element 20 may include multiple sections 22 (e.g., viewable sections) that each cause the light to be viewed differently. For example, the sections 22 may each include different color filters that each cause the light to be viewed as a different respective color (e.g., such that the angle-identifying element 20 is a color wheel), different pattern filters that each cause the light to be viewed as a different respective pattern, or any other suitable device that causes the light emitted from the reference element 14 to be distinguishably different from different viewpoints.

In FIG. 1, the sections 22A-D are illustrated as different patterns, where each pattern represents a different color filter. For example, section 22A may be a red filter that causes the light from the light source 16 to be viewed as red in color, section 22B may be a blue filter that causes the light from the light source 16 to be viewed as blue in color, section 22C may be a yellow filter that causes the light from the light source 16 to be viewed as yellow in color, and section 22D may be a green filter that causes the light from the light source 16 to be viewed as green in color. As such, when viewed from a first viewpoint (e.g., closest to the red filter 22A), the reference element 14 may appear to emit a red light or be red in color. However, when viewed from a second viewpoint (e.g., closest to the blue filter 22B, the reference element 14 may appear to emit a blue light or be blue in color.

Figure 2:
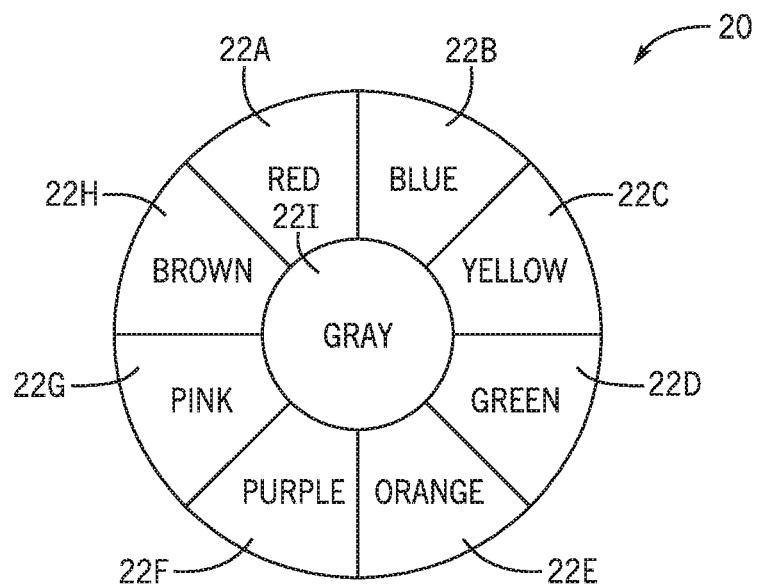
FIG. 2 is a schematic diagram of an angle-identifying element of the handheld object of FIG. 1 with nine sections, according to an embodiment of the present disclosure.

While four sections 22A-D are shown in the angle-identifying element 20, it should be understood that any suitable number of sections 22 may be used in the angle-identifying element 20 to facilitate determining an angle in which the handheld object 10 is oriented. For example, FIG. 2 is a schematic diagram of an angle-identifying element 20 of the handheld object 10 of FIG. 1 with nine sections 22, according to embodiments of the present disclosure. As illustrated, section 22A may be a red filter, section 22B may be a blue filter, section 22C may be a yellow filter, section 22D may be a green filter, section 22E may be an orange filter, section 22F may be a purple filter, section 22G may be a pink filter, section 22H may be a brown filter, and section 22I may be a gray filter, though any suitable number of filters having any suitable colors, patterns, or other form that causes the light emitted from the reference element 14 to be distinguishable (e.g., visually distinguishable) from different viewpoints, is contemplated. The sections 22 may be in any suitable form. For example, the sections 22 may be highly reflective sections of material that reflect outside light to facilitate detection by a monitoring system. As another example, the sections 22 may each be colored light bulbs which may facilitate detection by a monitoring system via coloring and/or operation (e.g., blinking). However, in the illustrated embodiment of FIG. 1, the sections 22 are pass through (e.g., translucent or transparent) filters and are referred to as such with respect to other embodiments as well.

The handheld object 10 also may include a device identifier 24 that enables light from the light source 16 to pass through. Like the angle-identifying element 20, the device identifier 24 may include a filter or a screen, such as in the form of a printed image. The device identifier 24 may include any suitable identifier, such as a barcode, a Quick Response (QR) code, a Universal Product Code (UPC), a serial number, a product number, and so on that can operate to associate data (e.g., user information, a profile) with the handheld object 10. FIG. 1 illustrates the device identifier 24 in the form of a printed QR code 26 that allows light from the light source 16 to pass through. However, as with the sections 22, the device identifier 24 may also take different forms (e.g., reflective material, light bulb arrangements). It should be noted that the angle-identifying element 20 and the device identifier 24 may be a single feature. For example, a combination of the sections 22 and the device identifier 24 may include a multi-colored QR code image that when viewed via a lens 28 of the reference element 14 from different angles appears to be different colors and such that combined views can be stitched together by a system processor to discern the QR code.

The handheld object 10 may include the lens 28 (e.g., a refractive lens), which disperses light from the light source 16 to facilitate detecting the reference element 14 (e.g., to facilitate determining the position of the handheld object 10) and facilitate determining the color of the light emitted from the reference element 14. In particular, the lens 28 may be positioned adjacent the sections 22 and device identifier 24 (which may be combined) such that light refracts in a manner that makes different portions of the sections 22/device identifier 24 viewable from different angles. As understood in the art, the lens 28 may include various shapes (e.g., prismatic or spherical) for this purpose. As illustrated, the lens 28 has a spherical shape and is made of glass, and, as such may expand the light emitted from the light source 16 and/or show a zoomed in view of the section 22 of the angle-identifying element 20 visible to (e.g., in the line-of-sight of) the viewer, though any suitable shape or material of the lens 28 that facilitates determining the color of the light emitted from the reference element 14 when viewing the handheld object 10 is contemplated. The lens 28 may be representative of a half sphere, a triangular prism, or the like and may be made of plastic instead of glass. Moreover, in some embodiments, a set of baffles or other device that aims the light in certain directions (e.g., to indicate the angle that the handheld object 10 is being held) may be used. It should be further noted that, in other embodiments, the light source 16 is not present and light is both received into and dispersed from the lens 28 to facilitate detection of aspects of the reference element 14 that can be correlated to positioning and/or associated data.

In some embodiments, the handheld object 10 may include one or more holding features 30, such as one or more depressed finger indentations 30A and/or ridge 30B. The holding features 30 may guide a user to hold the handheld object 10 in a particular manner. For example, the holding features 30 may ensure that a user holds the handheld object 10 in a constant orientation such that the user does not rotate the angle-identifying element 20 while holding or using the handheld object 10. The holding features 30 may include any additional or other suitable feature that prevents rotation of the handheld object 10 when held by the user, such as a finger guard (e.g., to ensure that the user inserts their index finger in the guard and thus will be unlikely to rotate the handheld object 10) relative to the user's grip orientation. This may facilitate proper assessment of motion based on patterns of detection of the reference element 14 and associated imagery.

In additional or alternative embodiments, the user may perform a calibration process via a controller or control system (such as the controller 90 illustrated in FIG. 7 and discussed in further detail below), to determine how the user is holding the handheld object 10 (e.g., an initial orientation of the handheld object 10, as held by the user), such that the reference element 14 is emitting a light (e.g., emitting light by reflecting an external light or emitting a light from an internal light source) corresponding to a respective section 22 being in a certain position. For example, a camera communicatively coupled to the controller may view the reference element 14 as having a blue color because the blue filter 22B is visible to and/or in the line-of-sight of the camera via the lens 28. Further detection of the color of the reference element 14 may indicate the angle of the handheld object 10 based at least on the calibration position. That is, if the camera then captures an image of the reference element 14 as having a red color because the red filter 22A is visible to the camera via the lens 28, then the controller may determine the angle due to the position of the red filter 22A relative to the blue filter 22B on the angle-identifying element 20.

Because the components of the handheld object 10 (e.g., the angle-identifying element 20, the device identifier 24, the lens 28) are relatively simple (e.g., a color filter, a printed barcode, a glass sphere), the handheld object 10 may be relatively easy to mass-produce. Moreover, because the components are relatively small (e.g., each may have a diameter of less than three centimeters (cm), less than two cm, less than one cm, less than 0.5 cm, less than 0.3 cm), the reference element 14 may have low visual impact. That is, the reference element 14 may not take away from the user experience of using the handheld object 10. Moreover, if the light source 16 emits or reflects light that is invisible to the human eye (e.g., infrared light, ultraviolet light), the reference element 14 may have an even lower visual impact.

Figure 3:
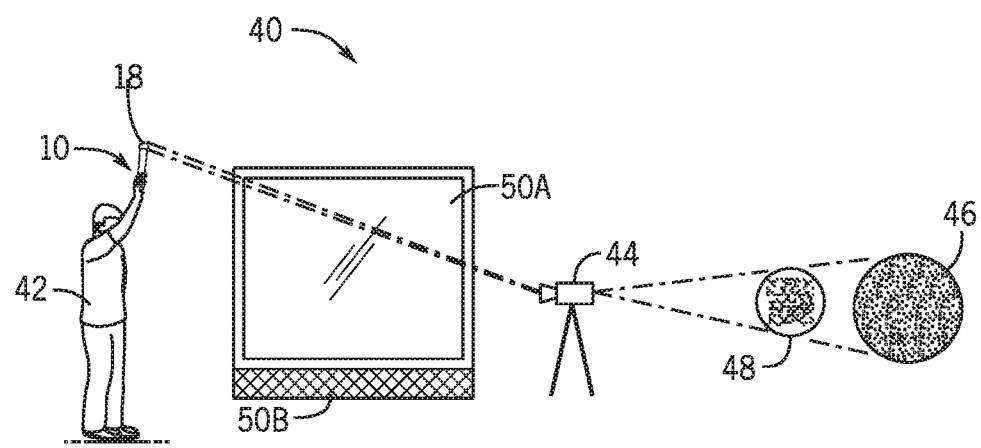
FIG. 3 is a schematic diagram of a theme park attraction system with a user holding the handheld object of FIG. 1 at a first angle, according to an embodiment of the present disclosure.

With this in mind, FIG. 3 is a schematic diagram of a theme park attraction or entertainment system 40 with a user 42 holding the handheld object 10 at a first angle, according to embodiments of the present disclosure. The theme park attraction system 40 may enable the user 42 to point the handheld object 10 at certain targets or move the handheld object 10 to perform certain gestures or follow certain patterns, and output a user interaction experience in response. For example, the theme park attraction system 40 may include a setting having characters popular with children, a television or movie-themed setting, a shooting gallery, a collection of targets, and so on.

The theme park attraction system 40 may include a camera 44 or other image capture device that captures an image of the handheld object 10. A controller or control system (such as the controller 90 illustrated in FIG. 7 and discussed in further detail below) may be communicatively coupled to the camera 44, and determine a position or location of the reference element 14 of the handheld object 10 (e.g., based on the captured image of the handheld object 10). The controller may determine the position of the reference element 14 on a two-dimensional plane or in three dimensions. Moreover, the controller may determine a pointing angle of the handheld object 10 based on the color detected from the reference element 14. In some embodiments, the locations of the camera 44 and the reference element 14 or components of the reference element 14 may be reversed. That is, the camera 44 may be attached or mounted to the handheld object 10, while the reference element 14, the angle-identifying element 20, the device identifier 24, and/or the lens 28 may be in a fixed position remotely located from the handheld object 10.

To determine the position of the reference element 14 in three dimensions, the theme park attraction system 40 may include a second camera (also represented by element 44) to capture images of the handheld object 10, which may provide a depth dimension (e.g., z axis) to a two-dimensional plane (e.g., x-y axes). In additional or alternative embodiments, the reference element 14 may include a second lens and a second angle-identifying element (also represented by elements 28 and 20). In this manner, the theme park attraction system 40 may include a single camera 44, but still be able to determine the position of the reference element 14 in three dimensions by tracking a third rotational axis based on the two lenses and the two angle-identifying elements.

As illustrated, based on the camera's viewpoint, the reference element 14 appears to emit a green light 46. This is due to positioning of the green filter 22D relative to the line-of-sight of the camera 44, refraction via the lens 28 with respect to the viewing angle of the camera 44, and the light source 16 of the handheld object 10 emitting light through the green filter 22D. This correlates to an orientation of the handheld object 10 relative to the camera 44, and this correlation may be provided by a processor of the controller (such as the processor 92 illustrated in FIG. 7 and discussed in further detail below) of the park attraction system 40 that employs an algorithm or table stored in a memory (such as the memory 94 illustrated in FIG. 7 and discussed in further detail below) of the park attraction system 40. Accordingly, based on the color of the reference element 14 and/or the determined position of the reference element 14, the controller may determine an angle at which the user 42 is holding the handheld object 10. For example, the detection of the green light 46 may correlate to the user pointing the handheld object 10 up.

The image captured by the camera 44 may also include a first portion 48 of the device identifier 24. However, the controller may not be able to read the device identifier 24 as only the first portion 48 is captured due to the refractive nature of the lens 28. That is, because the lens 28 may expand the light emitted from the reference element 14, the lens 28 may also expand or zoom in on the device identifier 24 as viewed through the lens 28, causing the camera 44 to capture only the first portion 48 in the image. As such, the controller may store the first portion 48 of the device identifier 24 in memory to combine with other portions of the device identifier 24, until the complete device identifier 24 may be generated. For example, the memory and the processor may be programmed to stitch together images of the device identifier 24 based on correlations of overlapping imagery to provide a unified image of the device identifier 24.

As illustrated, the theme park attraction system 40 may include one or more output devices 50, such as an animated figure, an electronic display 50A or a speaker 50B. The controller (such as the controller 90 illustrated in FIG. 7 and discussed in further detail below) may instruct an output device 50 to output a user interaction experience (e.g., a certain movement or actuation, image, video, or audio data) based on the determined position of the handheld object 10, the determined angle of the handheld object 10, and/or the determined device identifier 24. For example, if the controller determines that the handheld object 10 is pointing at an animated object (e.g., a robot or otherwise animated figure), the controller may instruct the animated object to output a user interaction experience (e.g., wagging a tail). As another example, if the controller determines that the handheld object 10 is pointing at a word on a poster, and, the controller may instruct the speaker 50B to output a voice speaking the word. As yet another example, if the controller determines that the handheld object 10 is pointing at an image of a person on the display 50A, the controller may instruct the display 50A to play a video showing the person in the image moving. If the controller determines that the handheld object 10 has moved in a certain pattern or sequence (e.g., based on determining positions of the reference element 14 and/or determining angles of the handheld object 10 being held as captured in multiple images by the camera 44), the controller may instruct the output device 50 to output a user interactive experience (e.g., certain video and audio data) associated with the certain pattern or sequence (e.g., a figure eight). Once the controller determines the (complete) device identifier 24, the controller may instruct the output device 50 to output a user interactive experience that is associated with the device identifier 24 (e.g., instructing the speaker 50B to say the user's name).

Figure 4:
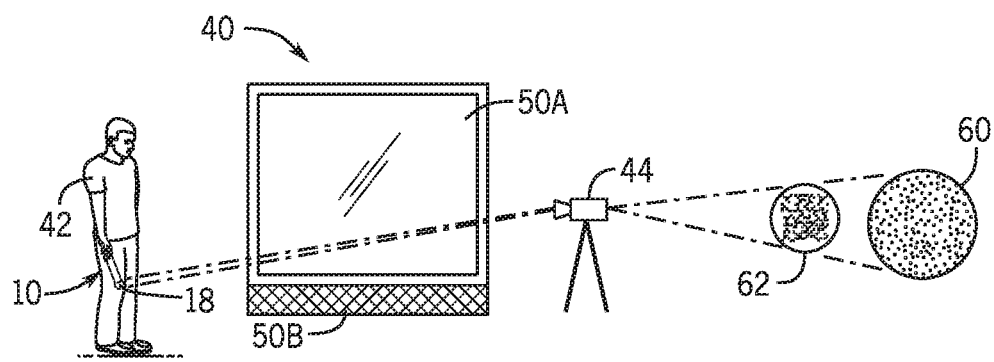
FIG. 4 is a schematic diagram of a theme park attraction system with a user holding the handheld object of FIG. 1 at a second angle, according to an embodiment of the present disclosure.

FIG. 4 is a schematic diagram of the theme park attraction system 40 with the user 42 holding the handheld object 10 at a second angle, according to embodiments of the present disclosure. As illustrated, based on the camera's viewpoint, the reference element 14 appears to emit a red light 60 due to the red filter 22A being visible to and/or in the line-of-sight of the camera 44, and the light source 16 of the handheld object 10 emitting light through the red filter 22A. Accordingly, based on the color of the reference element 14 and/or the determined position of the reference element 14, the controller (such as the controller 90 illustrated in FIG. 7 and discussed in further detail below) may determine an angle that the user 42 is holding the handheld object 10 (e.g., pointing the handheld object 10 down).

The image captured by the camera 44 may also include a second portion 62 of the device identifier 24. If the controller can combine the captured images of the first portion 48 of the device identifier 24 from FIG. 3 and the second portion 62 to complete the device identifier 24, then the controller may be able to read the complete device identifier 24 and use that to discern related data. If not, the controller may store the second portion 62 of the device identifier 24 in memory to combine with other portions of the device identifier 24, until the complete device identifier 24 may be generated. In particular, the controller may identify overlapping sections between portions of the device identifier 24 to determine that the portions of the device identifier 24 fit together, and combine those portions to save in the memory. The controller may also identify ends of the device identifier 24 in the portions of the device identifier 24, and determine that a complete device identifier 24 has been combined when the combined portions of the device identifier 24 include the ends of the device identifier 24.

Figure 5:
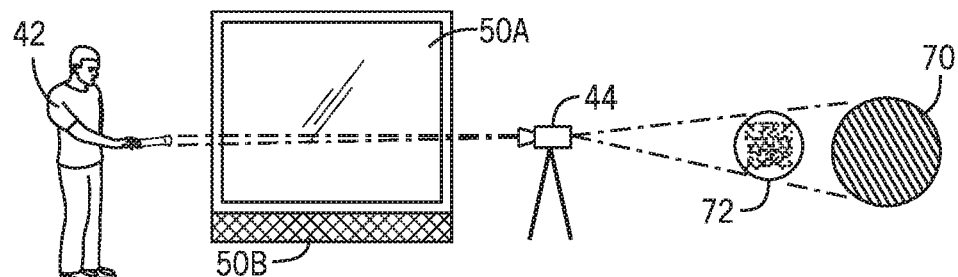
FIG. 5 is a schematic diagram of a theme park attraction system with a user holding the handheld object of FIG. 1 at a third angle, according to an embodiment of the present disclosure.

FIG. 5 is a schematic diagram of the theme park attraction system 40 with the user 42 holding the handheld object 10 at a third angle, according to embodiments of the present disclosure. As illustrated, based on the camera's viewpoint, the reference element 14 appears to emit a blue light 70 due to the blue filter 22B being visible to and/or in the line-of-sight of the camera 44, and the light source 16 of the handheld object 10 emitting light through the blue filter 22B. Accordingly, based on the color of the reference element 14 and/or the determined position of the reference element 14, the controller may determine an angle that the user 42 is holding the handheld object 10 (e.g., pointing the handheld object 10 to the left from the user's viewpoint).

The image captured by the camera 44 may also include a third portion 72 of the device identifier 24. If the controller can combine the images of the first portion 48 of the device identifier 24 from FIG. 3, the second portion 62 from FIG. 4, and the third portion 72 to provide a complete image of the device identifier 24, then the controller may be able to read the complete device identifier 24. If not, the controller may store the image of the third portion 72 of the device identifier 24 in memory to combine with other image portions of the device identifier 24, until an image of the complete device identifier 24 may be generated.

Figure 6:
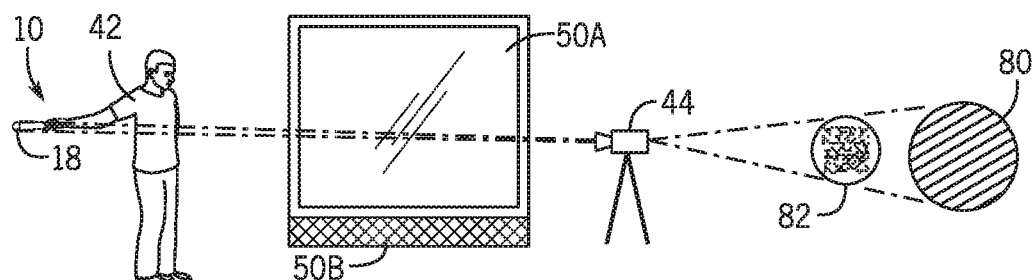
FIG. 6 is a schematic diagram of a theme park attraction system with a user holding the handheld object of FIG. 1 at a fourth angle, according to an embodiment of the present disclosure.

FIG. 6 is a schematic diagram of the theme park attraction system 40 with the user 42 holding the handheld object 10 at a fourth angle, according to embodiments of the present disclosure. As illustrated, based on the camera's viewpoint, the reference element 14 appears to emit a yellow light 80 due to the yellow filter 22C being visible to and/or in the line-of-sight of the camera 44, and the light source 16 of the handheld object 10 emitting light through the yellow filter 22C. Accordingly, based on the color of the reference element 14 and/or the determined position of the reference element 14, the controller (such as the controller 90 illustrated in FIG. 7 and discussed in further detail below) may determine an angle that the user 42 is holding the handheld object 10 (e.g., pointing the handheld object 10 to the right from the user's viewpoint).

The image captured by the camera 44 may also include a fourth portion 82 of the device identifier 24. If the controller can combine the images of the first portion 48 of the device identifier 24 from FIG. 3, the second portion 62 from FIG. 4, the third portion 72 from FIG. 5, and the fourth portion 82 to complete an image of the full device identifier 24, then the controller may be able to read the complete device identifier 24. If not, the controller may store the image of the fourth portion 82 of the device identifier 24 in memory to combine with other images of portions of the device identifier 24, until the complete device identifier 24 may be generated.

Figure 7:
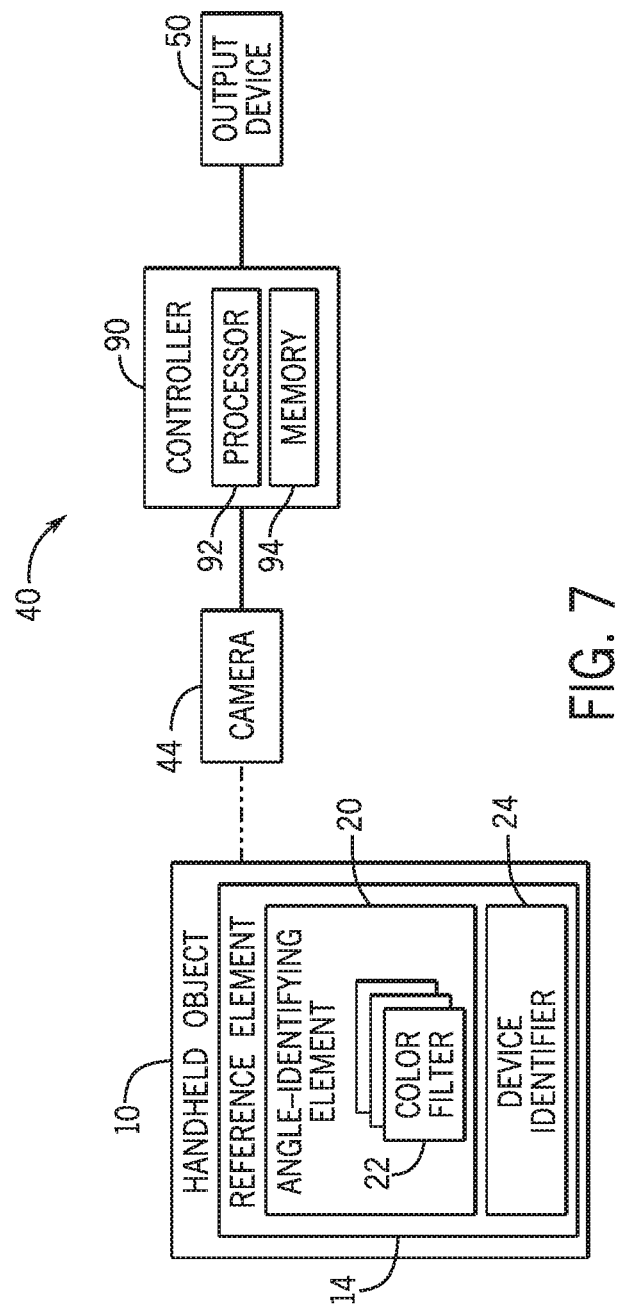
FIG. 7 is a block diagram of the theme park attraction system of FIGS. 3-6, according to an embodiment of the present disclosure.

FIG. 7 is a block diagram of the theme park attraction system 40 of FIGS. 3-6, according to embodiments of the present disclosure. As illustrated, the camera 44, which may be communicatively coupled to a controller 90, may capture an image of the handheld object 10. The image may include a color of the reference element 14 as detected by the camera 44 via transmission through the lens 28. This color may correspond to the section 22 of the angle-identifying element 20 through which the light source 16 emits a light or that is reflecting light and that is directed toward the camera 44 via refraction by the lens 28. The image may also include a portion of the device identifier 24, which may be detected in a similar manner or as part of detection of the color.

The controller 90 may include one or more processors (illustrated and referred to in this disclosure as a single processor 92) and one or more memory or storage devices (illustrated and referred to in this disclosure as a single memory device 94). The processor 92 may execute software programs and/or instructions stored in the memory device 94 that facilitate determining the position of the handheld object 10 and/or the reference element 14, determining the color of the reference element 14, determining the angle of the handheld object 10, and/or the device identifier 24. Moreover, the processor 92 may include multiple microprocessors, one or more "general-purpose" microprocessors, one or more special-purpose microprocessors, and/or one or more application specific integrated circuits (ASICs). For example, the processor 92 may include one or more reduced instruction set computer (RISC) processors. The memory device 94 may store information such as control software, look up tables, configuration data, and so forth. The memory device 94 may include a tangible, non-transitory, machine-readable-medium, such as volatile memory (e.g., a random access memory (RAM)), nonvolatile memory (e.g., a read-only memory (ROM)), flash memory, one or more hard drives, and/or any other suitable optical, magnetic, or solid-state storage medium. The memory device 94 may store a variety of information and may be used for various purposes, such as instructions that facilitate determining the position of the handheld object 10 and/or the reference element 14, determining the color of the reference element 14, determining the angle of the handheld object 10, and/or the device identifier 24.

In particular, the processor 92 may perform image recognition techniques stored in the memory device 94 to detect the reference element 14, the color of the reference element 14, and/or the device identifier 24 in an image of the handheld object 10 captured by the camera 44. The processor 92 may then determine the angle of the handheld object 10 based on, for example, the position of the reference element 14 and/or the color of the reference element 14. This may include comparing detected characteristics (e.g., coloring, patterns) with tables of information or running algorithms based on the detected characteristics to identify correlative positioning and identity information for the related handheld object 10.

The controller 90 may also be communicatively coupled to the output device 50, and instruct the output device 50 (e.g., an animated figure, an electronic display, a speaker) to output an action, image, video, audio data, and so on. The controller 90 may be communicatively coupled to the camera 44 and/or the output device 50 by any suitable means, such as via wired communication or over a communication network using a wireless communication protocol or technology (e.g., radio, Bluetooth, WiFi, infrared, Ethernet, Thread, ZigBee, Z-Wave, KNX, mobile, and/or microwave).

Figure 8:
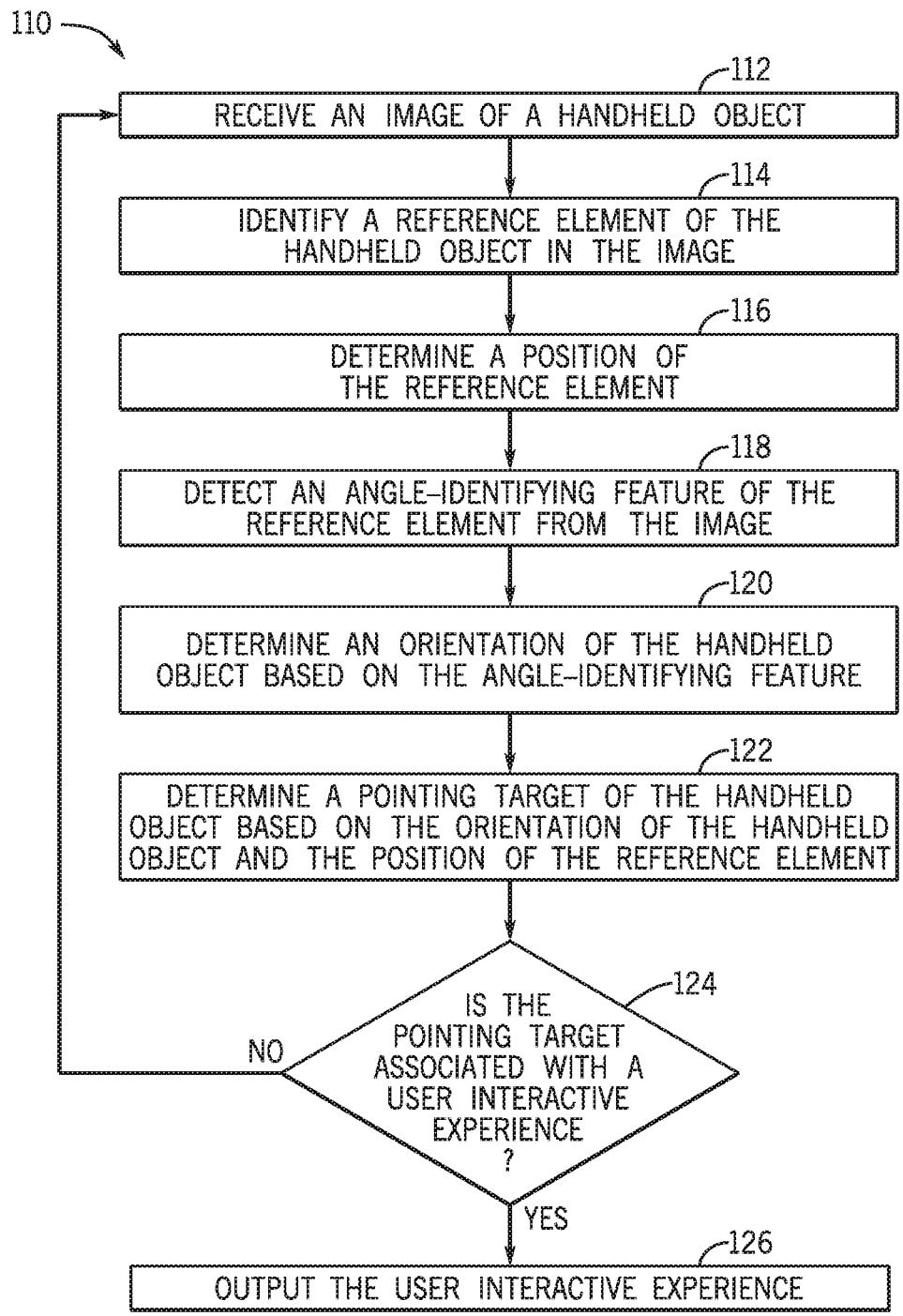
FIG. 8 is a flow diagram of a process for determining a pointing target of the handheld object of FIG. 1, according to an embodiment of the present disclosure.

With the preceding in mind, FIG. 8 is a flow diagram of a process 110 for determining a pointing target of the handheld object 10, according to embodiments of the present disclosure. The process 110 may be performed by any suitable system that may determine the pointing target of the handheld object 10, such as any component of the theme park attraction system 40, including the camera 44, the controller 90, the processor 92, and/or the output device 50.

While the process 110 is described using steps in a specific sequence, it should be understood that the present disclosure contemplates that the described steps may be performed in different sequences than the sequence illustrated, and certain described steps may be skipped or not performed altogether. In some embodiments, the process 110 may be implemented by executing instructions stored in a tangible, non-transitory, computer-readable medium, such as the memory device 94, using a processor, such as the processor 92.

As illustrated, in process block 112, the processor 92 receives an image of the handheld object 10. In particular, the camera 44 may capture the image of the handheld object 10 (e.g., as held by the user 42), and send the image to the controller 90 and the processor 92 in particular. The processor 92, which may be resident in the controller 90, may thus receive the image (e.g., data indicative of captured imagery).

In process block 114, the processor 92 identifies the reference element 14 of the handheld object 10 in the image. For example, the processor 92 may use image recognition techniques (e.g., stored as instructions in the memory device 94) to detect a characteristic (e.g., a color, marking, lens shape) of the viewable aspect of the reference element 14. The detected characteristic may be used to identify the reference element 14 and/or discern a relative positioning of the handheld object 10.

In process block 116, the processor 92 determines a position of the reference element 14 or the handheld object 10. The processor 92 may determine the position of the reference element 14 or the handheld object 10 on a two-dimensional plane (e.g., the plane of the image) or in three dimensions. This may be done by the processor 92 implementing image recognition techniques or algorithms, including machine learning, artificial intelligence, deep learning, convolutional neural networks, and so on. For example, the memory 94 may store an image recognition model which may be trained by inputting sample images of the reference element 14 or the handheld object 10 and indications of where the reference element 14 or the handheld object 10 is located in the sample images. The processor 92 may then use the trained image recognition model to determine the reference element 14 or the handheld object 10 in an image, and determine the position of the reference element 14 or the handheld object 10 in the image (e.g., the pixels of the image corresponding to the reference element 14 or the handheld object 10).

Figures 9, 10:
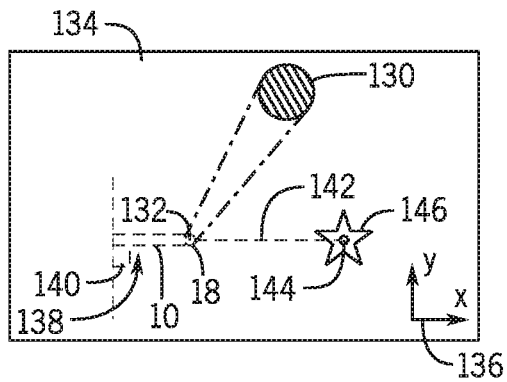
FIG. 9 is a schematic diagram of a processor of the handheld object of FIG. 1 determining orientation of the handheld object based on an angle-identifying feature, according to an embodiment of the present disclosure.
FIG. 10 is a flow diagram of a process for determining a device identifier of the handheld object of FIG. 1, according to an embodiment of the present disclosure.

In process block 118, the processor 92 detects a visible characteristic of an angle-identifying feature of the reference element 14 in the image. In particular, the processor 92 may detect the color of the light emitted from the reference element 14, corresponding to the color of the light as filtered through a colored filter 22 of the angle-identifying element 20. This detected characteristic may then be used in process block 120, wherein the processor 92 determines an orientation of the handheld object 10 based on the angle-identifying feature. In particular, the processor 92 may estimate the orientation of the handheld object 10 based on the color of the light emitted by the reference element 14. For example, FIG. 9 is a schematic diagram of the processor 92 determining orientation of the handheld object 10 based on the angle-identifying feature 130, according to an embodiment of the present disclosure. The processor 92 maps a position 132 of the reference element 14 on a two-dimensional plane 134 as determined in process block 116, though, in some embodiments, the position 132 may mapped in three dimensions. A coordinate axis 136 is illustrated for reference. As illustrated, the processor 92 detects that the angle-identifying feature 130 is blue (e.g., due to the color of the light passing through the blue filter 22B and emitted from the reference element 14). Based on the position of the blue filter 22B on the angle-identifying element 20, the processor 92 may determine that the handheld object 10 is in the orientation 138, e.g., such as by using a table or algorithm that correlates such data. For example, the processor 92 may use an image recognition model stored in the memory 94 which may be trained by inputting sample images of the reference element 14 and indications of the orientation of the reference element 14 in the sample images. The processor 92 may use the trained image recognition model to determine the orientation 138 of the reference element 14. In additional or alternative embodiments, the processor 92 may use any suitable other image recognition techniques or algorithms, including machine learning, artificial intelligence, deep learning, convolutional neural networks, and so on.

In some embodiments, the processor 92 may determine that the handheld object 10 is in the orientation 138 based on how the user holds the handheld object 10 (e.g., using the holding features 30 shown in FIG. 1 to establish a baseline orientation), a calibration process, an estimated or known height of the user, a position or location of the user, and so on. For example, if the height of the user is estimated or known, then an end position (opposite the reference element 14) of the handheld object 10 may be estimated based on height of the user (e.g., the end position may point to a center of the user), and the orientation 138 may be inferred. Similarly, if a position or location of the user is known, then an end position of the handheld object 10 may be estimated based on the position of the user, and the orientation 138 may be inferred. In some embodiments, the processor 92 may determine an angle 140 of the handheld object 10. For example, in relation to the y axis of the coordinate axis 136, the angle 140 of the handheld object 10 is approximately 90 degrees.

In process block 122, the processor 92 determines a pointing target of the handheld object 10 based on the orientation of the handheld object 10 and the position of the reference element 14. The pointing target may include an image, object, portion of an image, and so on, that a user is pointing the handheld object 10 at. In particular, the processor 92 may extend the direction 142 of the orientation of the handheld object 10 from the position of the reference element 14, and determine the pointing target 144 by estimating an end point of the direction 142.

In decision block 124, if the pointing target 144 is associated with a user interactive experience, then, in process block 126, the processor 92 instructs the output device 50 to perform the user interactive experience. As illustrated in FIG. 9, a graphical object 146 is provided (e.g., on a wall) or displayed (e.g., on an electronic display 50A). Because the pointing target 144 is on or in line with the graphical object 146, the processor 92 may instruct a speaker 50B to output audio data (e.g., associated with the graphical object), instruct a display 50A to cause the graphical object 146 to move (e.g., by playing a video), instruct an animated object to move, and so on. If the pointing target 144 is not associated with a user interactive experience, then the processor 92 repeats the process 110. In this manner, the process 110 may enable the processor 92 to determine the pointing target 144 of the handheld object 10, without the expense or complexity associated with including active elements (e.g., gyroscopes, communication devices) in the handheld object 10 to send position information to the controller 90.

In some embodiments, the processor 92 may instruct the output device 50 to perform the user interactive experience based on one or more orientations of the handheld object. For example, the memory 94 may store a certain pattern (e.g., a zigzag pattern, a figure eight pattern, a letter or number pattern), and the processor 92 may determine whether the user is moving the handheld object 10 in the certain pattern. This may be done by the processor 92 implementing image recognition techniques or algorithms, including machine learning, artificial intelligence, deep learning, convolutional neural networks, and so on. For example, the memory 94 may store an image recognition model which may be trained by inputting sample images of the reference element 14 being moved or "drawn" in the certain pattern. The processor 92 may then use the trained image recognition model to determine whether the reference element 14 is moving in the certain pattern.

The processor 92 may also determine a device identifier 24 of the handheld object 10, which may uniquely identify the handheld object 10, associate the handheld object 10 with a user, and/or associate the handheld object 10 with a user profile. FIG. 10 is a flow diagram of a process 160 for determining the device identifier 24 of the handheld object 10, according to embodiments of the present disclosure. The process 160 may be performed by any suitable device that may determine the device identifier 24 of the handheld object 10, such as any component of the theme park attraction system 40, including the camera 44, the controller 90, the processor 92, and/or the output device 50. While the process 160 is described using steps in a specific sequence, it should be understood that the present disclosure contemplates that the described steps may be performed in different sequences than the sequence illustrated, and certain described steps may be skipped or not performed altogether. In some embodiments, the process 160 may be implemented by executing instructions stored in a tangible, non-transitory, computer-readable medium, such as the memory device 94, using a processor, such as the processor 92.

As illustrated, in process block 162, the processor 92 receives an image of the handheld object 10. In particular, the processor 92, which is located in the controller 90, may receive the image from the camera 44 after the camera 44 has captured the image of the handheld object 10 and transmitted the image to the processor 92. Using the received image, in process block 164, the processor 92 determines at least a portion of the device identifier 24. Because the lens 28 of the reference element 14 may adjust the light (e.g., light emitted from the light source 16) used to detect the device identifier 24, a limited portion of the device identifier 24 may be discernable from a given image. For example, the lens 28 may expand or zoom in on the device identifier 24 as viewed through the lens 28, causing the camera 44 to capture only a portion of the device identifier 24 in the image. Specifically, for example, as illustrated in FIG. 3, the camera 44 may capture only the first portion 48 in an image.

In process block 166, the processor 92 combines the image of the portion of the device identifier 24 with any other images of respective portions of the device identifier 24. For example, the processor 92 may store other images of portions of the device identifier 24 determined from previously captured images in a memory or storage device, such as the memory device 94. As such, the processor 92 may combine or stitch together the portion (e.g., the first portion 48) of the device identifier 24 with any stored portions. The processor 92 may use any suitable image combining or forming technique or algorithm to combine the portions together. In particular, the processor 92 may identify overlapping sections between portions of the device identifier 24 to determine that the portions of the device identifier 24 fit together, and combine those portions to save in the memory 94.

In decision block 168, the processor 92 determines whether the combined images of portions of the device identifier 24 form an image of the complete device identifier 24 (e.g., an image that suffices to read and associate the device identifier 24 with all related information). In particular, the processor 92 may identify ends of the device identifier 24 in the portions of the device identifier 24, and determine that a complete device identifier 24 has been combined when the combined portions of the device identifier 24 include the ends of the device identifier 24.

If the processor 92 does not determine that the combined portions of the device identifier 24 form a complete image of the device identifier 24, then the imagery of the device identifier 24 is incomplete and therefore cannot be read by the processor 92, and the processor 92, in process block 170, stores the portion of the device identifier 24 (e.g., in the memory device 94), and repeats the process 160 by receiving a subsequent image of the handheld object 10.

If the processor 92 determines that the combined portions of the device identifier 24 form a complete image of the device identifier 24, then the processor 92, in process block 172, reads the device identifier 24 and identifies the handheld object 10 using the device identifier 24. In particular, the memory 94 may store a correlation of the device identifier 24 with identification data (e.g., identification numbers) for the handheld object 10, a user, and/or a user profile.

In decision block 174, if the device identifier 24 is associated with a user interactive experience, then, in process block 176, the processor 92 instructs the output device 50 to perform the user interactive experience. For example, the device identifier 24 may be associated with a user profile. As such, the processor 92 may query a database (e.g., stored in the memory device 94) for the user's name that may be a field of the user profile, and instruct speaker 50B to say the user's name. If the device identifier 24 is not associated with a user interactive experience, then the processor 92 repeats the process 160.

In this manner, the process 160 may enable the processor 92 to determine the device identifier 24 of the handheld object 10, without the expense or complexity associated with including active elements (e.g., communication devices) in the handheld object 10 to send identification information to the controller 90. In some embodiments, the process 110 and the process 160 may be combined. That is, the processor 92 may both determine the pointing target of the handheld object 10 while determining the device identifier 24 of the handheld object 10 by performing the processes 110 and 160.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. An entertainment system comprising:
   a camera configured to capture an image of a handheld object including an angle-identifying element of the handheld object; and
   a controller having a processor and a memory, the memory storing machine-readable instructions configured to cause the processor to:
      combine the image comprising at least a portion of the angle-identifying element and previously stored images of portions of the angle-identifying element to form a combined image;
      identify the angle-identifying element of the handheld object in the combined image; and
      determine an orientation of the handheld object based on a detected characteristic of the angle-identifying element in the combined image.

2. The entertainment system of claim 1, wherein the processor is configured to determine position of the handheld object in the combined image, and determine a pointing target of the handheld object based on the position and orientation of the handheld object.

3. The entertainment system of claim 1, comprising the handheld object, wherein the angle-identifying element comprises a refractive lens positioned over a plurality of viewable sections, and wherein light emitted through or reflected from each viewable section of the plurality of viewable sections is distinguishable in relation to light emitted through or reflected from other viewable sections of the plurality of viewable sections.

4. The entertainment system of claim 3, wherein the handheld object comprises a light source, wherein each viewable section of the plurality of viewable sections comprises a pass-through filter.

5. The entertainment system of claim 1, comprising the handheld object, wherein the handheld object comprises a device identifier positioned adjacent a lens configured to enable the camera to capture a second image of at least a portion of the device identifier.

6. The entertainment system of claim 1, comprising an output device configured to output a user interactive experience, wherein the memory stores machine-readable instructions configured to cause the processor to read the combined image and instruct the output device to output the user interactive experience based on the combined image.

7. The entertainment system of claim 5, wherein the memory stores a correlation of the device identifier with identification data for the handheld object, a user, a user profile, or any combination thereof.

8. The entertainment system of claim 5, wherein the device identifier comprises a barcode, a Quick Response (QR) code, a Universal Product Code (UPC), a serial number, a product number, or any combination thereof.

9. The entertainment system of claim 1, comprising an output device configured to output a user interactive experience, wherein the memory stores machine-readable instructions configured to cause the processor to instruct the output device to output the user interactive experience based on the orientation of the handheld object.

10. The entertainment system of claim 1, wherein the angle-identifying element comprises a plurality of sections, and wherein each section of the plurality of sections is visually distinguishable in relation to other sections of the plurality of sections.

11. The entertainment system of claim 10, wherein the plurality of sections combine to provide a device identifier.

12. A handheld object configured to facilitate detection of an orientation of the handheld object by a monitoring system, the handheld object comprising:
- a body configured to be handheld;
- an angle-identifying element comprising a plurality of sections, wherein each section of the plurality of sections is visually distinguishable in relation to other sections of the plurality of sections, wherein the plurality of sections combine to provide a device identifier; and
- a lens positioned adjacent the angle-identifying element such that one or more sections of the plurality of sections are visible, via the lens, to a camera at a particular position relative to the angle-identifying element.

13. The handheld object of claim 12, comprising a light source, wherein the light source is configured to emit light through each of the plurality of sections and through the lens.

14. The handheld object of claim 13, wherein the light source comprises a liquid crystal display, a light-emitting diode, or an organic light-emitting diode.

15. The handheld object of claim 12, wherein the device identifier comprises a barcode, a Quick Response (QR) code, a Universal Product Code (UPC), a serial number, a product number, or any combination thereof.

16. The handheld object of claim 12, comprising a holding feature configured to guide a user to hold the handheld object in a particular manner.

17. The handheld object of claim 12, wherein the plurality of sections are made of reflective material.

18. The handheld object of claim 12, wherein the lens is configured to expand light emitted through or reflected by the plurality of sections.

19. One or more non-transitory, computer-readable media storing instructions which, when executed by at least one processor, cause the at least one processor to perform operations comprising:
- receiving an image of a handheld object;
- identifying a reference element of the handheld object in the image, wherein the reference element comprises an angle-identifying element;
- determining a position of the handheld object based on the image;
- combining the image comprising at least a portion of the angle-identifying element and previously stored images of portions of the angle-identifying element to form a combined image;
- detecting the angle-identifying feature of the reference element in the combined image;
- determining an orientation of the handheld object based on a characteristic of the angle-identifying feature; and
- determining a pointing target of the handheld object based on the position and orientation of the handheld object.

20. The one or more non-transitory, computer-readable media of claim 19, wherein the instructions cause the at least one processor to perform operations comprising performing a calibration process to determine an initial orientation of the handheld object based on the characteristic of the angle-identifying feature of the reference element in the combined image.

* * * * *